United States Patent
Mydlarz

(10) Patent No.: US 7,159,883 B2
(45) Date of Patent: Jan. 9, 2007

(54) FRONT SUSPENSION FOR VEHICLES WITH FRONT STEERABLE WHEEL

(75) Inventor: Jerzy Mydlarz, Gliwice (PL)

(73) Assignee: Delphi Technologies, Inc., Troy, MI (US)

( * ) Notice: Subject to any disclaimer, the term of this patent is extended or adjusted under 35 U.S.C. 154(b) by 137 days.

(21) Appl. No.: 10/968,837

(22) Filed: Oct. 19, 2004

(65) Prior Publication Data
US 2005/0082785 A1    Apr. 21, 2005

(30) Foreign Application Priority Data
Oct. 20, 2003 (PL) ..................... 362951

(51) Int. Cl.
*B62M 7/00*  (2006.01)
*B62K 21/04* (2006.01)
*B62K 21/20* (2006.01)

(52) U.S. Cl. ............ 280/276; 280/275; 280/283; 280/284

(58) Field of Classification Search ........... 280/275, 280/276, 283, 284
See application file for complete search history.

(56) References Cited

U.S. PATENT DOCUMENTS

| | | | | |
|---|---|---|---|---|
| 980,999 | A * | 1/1911 | Pommer | 280/276 |
| 1,261,441 | A * | 4/1918 | Rigby | 280/276 |
| 2,513,496 | A * | 7/1950 | Kranz | 280/304.3 |
| 4,669,747 | A | 6/1987 | Groendal | |
| 5,301,969 | A * | 4/1994 | Bynoe | 280/221 |
| 5,749,590 | A * | 5/1998 | Roerig | 280/276 |
| 5,772,227 | A | 6/1998 | Michail | |
| 6,382,370 | B1 * | 5/2002 | Girvin | 188/299.1 |
| 6,631,915 | B1 | 10/2003 | Barefoot | |

FOREIGN PATENT DOCUMENTS

| | | |
|---|---|---|
| DE | 19546770 | 6/1997 |
| DE | 19816636 | 10/1999 |
| EP | 0994014 | 4/2000 |
| FR | 2690408 | * 10/1993 |

* cited by examiner

Primary Examiner—Lesley D. Morris
Assistant Examiner—Marc A. Scharich
(74) Attorney, Agent, or Firm—Scott A. McBain

(57) ABSTRACT

The present invention relates to the front suspension containing elastic (14) and damping (11) elements, for vehicles with front steerable wheel, such as bicycles, motor-bicycles, motorcycles or tricycles. To minimise the total mass of the unsprung suspension elements, by relocating the elastic and the damping elements to the springing side, the suspension contains at least one cable (10) connected at one end to the upper part of the front wheel fork (1), able to shift in relation to the fork column (6) of the handle bar (7), and at the other end to the elastic element (14) and/or the damping element (11), supported on at least one end by the vehicle frame (8), wherein the cable (10) goes through the handle bar (7) steering axis. The cable (10) is preferably led on at least one leading element (16) supported by the vehicle frame. Optionally, the cable (10) may be connected on the other end to the fork (18) of the vehicle rear suspension.

10 Claims, 3 Drawing Sheets

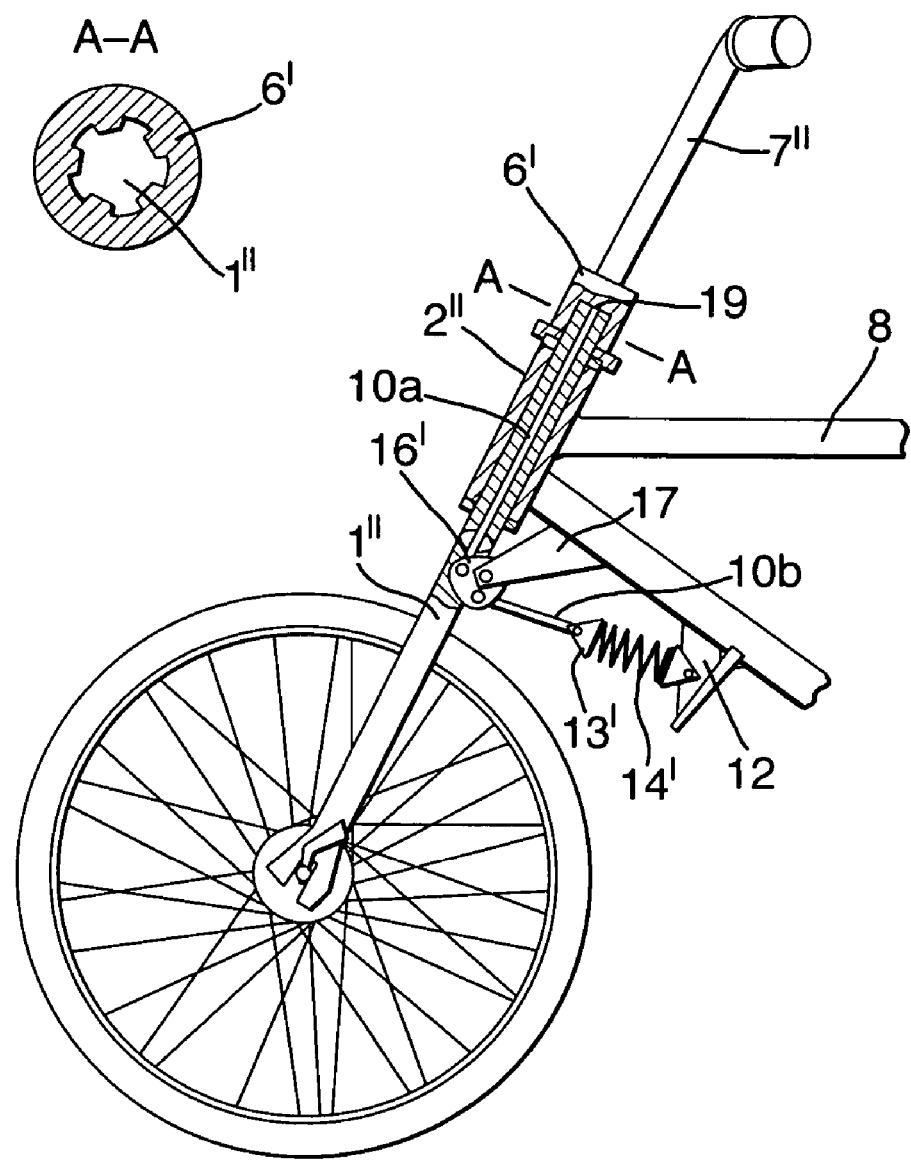

FRONT SUSPENSION FOR VEHICLES WITH FRONT STEERABLE WHEEL

TECHNICAL FIELD

The present invention relates to a front suspension containing elastic and damping elements, for vehicles with front steerable wheel, such as bicycles, motor-bicycles, motorcycles or tricycles.

BACKGROUND OF THE INVENTION

In designing bicycles and the like, it is normally the aim of the designing process to minimise the total mass of unsprung suspension elements placed on the wheel side of the vehicle, along with the wheel. This is caused by the need of decreasing the front fork tensions which are transmitted onto the steering column during riding on rough roads. However, in typical constructions of telescopic forks, the total mass of unsprung elements is increased by the weight of the spring and the damper.

In U.S. Pat. No 5,749,590 a front suspension is presented where the elastic and the damping elements are placed in the steering column and controlled by a multiple link pivot mounting mechanism. As a result, the mass of the fork was reduced, and the new transmission allowing for increasing the fork shift in relation to the shock absorber shift was introduced.

Another solution revealed in FR 2690408 patent specification is the motorcycle front suspension mechanism. The mechanism consists of a lever in form of a circular arc leaning on the front telescopic fork cover and allowing for its torsion. The lever is divided into two segments on both sides of the vehicle and is fixed to the vehicle chassis by roller bearings. The ends of the arms are held by counterweights on shock absorbers having the ability to lengthen, and the shock absorbers lean on under the rear fork arms, midway between the wheel axle and the fork pivoting axle. During braking the lever relieves front suspension and at the same time transmits the force onto the rear shock absorber so that the vehicle is kept in almost normal position and its two wheels stay in touch with the ground.

SUMMARY OF THE INVENTION

The aim of the present invention is to provide a front suspension for a vehicle with a front steerable wheel, with a minimal mass of unsprung suspension elements. In particular, the aim of the present invention is to provide the front suspension for a vehicle with a front steerable wheel, having elastic and damping elements placed on the springing side.

Another aim of the invention is to construct the front vehicle suspension with a front steerable wheel which would allow for the vehicle position stabilization by the appropriate transmission of the inertial forces which occur during braking or accelerating of the vehicle.

According to the present invention there is provided a front suspension which comprises at least one cable connected at one end to the upper part of the front wheel fork, able to shift in relation to the fork column of the handle bar, and at the other end to the elastic element and/or the damping element, supported on at least one end by the vehicle frame, wherein the cable goes through the handle bar steering axis.

Since the tensions transmitted during the drive onto the fork column of the handle bar by the unsprung suspension elements situated on the wheel side of the vehicle depend on its mass, placing the shock absorber to the vehicle frame allows a decrease in the required strength parameters of these elements. Arranging the cable along the handle bar steering axis does not result in its lengthening during the front wheel turning.

Preferably, the cable is led on at least one leading or guide element supported on the vehicle frame.

The guide element is preferably a turning roll.

Alternatively, the guide element can be a rocker connecting two parts of the cable, which allows use of several stiff cables instead of one flexible cable.

It is also possible to use a different guide element, for example, a sliding cam.

Preferably, the fork is able to shift in at least one sleeve connected to the fork column of the handle bar.

Then, it is preferable that the sleeve has rolling elements wherein the fork is led.

The sleeve can be alternatively equipped with appropriate slide linings.

Moreover, it is preferable that the shift axis of the fork and the steering axis of the handle bar are substantially parallel to each other.

In such case, it is preferable that fork column of the handle bar is seated rotationally on the sleeve in which the fork is led and connected to the fork by a sliding splined coupling.

Since the ground pressure affecting the front wheel is transmitted onto the cable, it is preferable to connect its other end to the fork of the vehicle rear suspension.

Thanks to the above, it is possible to couple the front and the rear suspension shifts in order to reduce the "vehicle diving" during braking or lifting the front wheel during rapid acceleration.

In such case, the elastic element and/or the damping element may preferably be the shock absorber of the vehicle rear suspension.

Preferably, the cable is made of a flexible material, thanks to which the cable takes part in amortisation and dissipation of vibration energy.

BRIEF DESCRIPTION OF THE DRAWINGS

The object of the invention is shown on the examples in the figure, where

FIG. 5 shows, in side view, another example of front suspension in partial section.

DESCRIPTION OF THE PREFERRED EMBODIMENT

Figure 1:
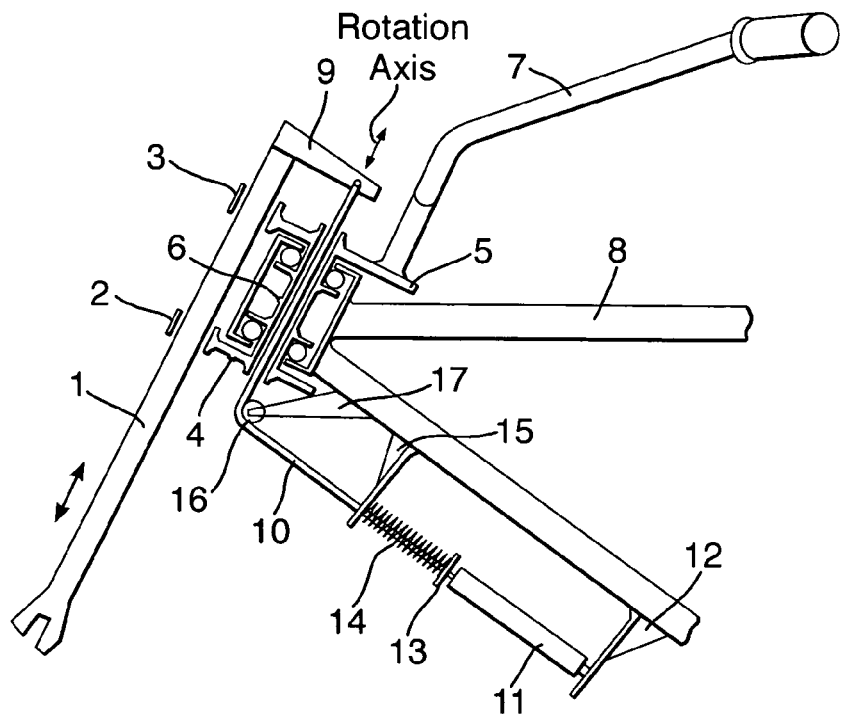
FIG. 1 shows schematically, in side view, the mode of operation of the front suspension according to the present invention.

As shown in FIG. 1, fork 1 comprises two tubes adapted for holding a front steering wheel of a vehicle (not shown). Each of the fork tubes is stabilized and slidingly received in a bottom sleeve 2 and an upper sleeve 3. The sleeves contain appropriate friction reducing materials between the fork tubes, for example, slide linings or rolling elements. The bottom sleeve 2 and the upper sleeve 3 are mounted to the bottom support 4 and the upper support 5 connected to the fork column 6 of the handle bar 7 of the vehicle. The fork column 6 is fixed in the known way to the frame 8 of the vehicle.

Above the upper sleeve 3, the fork tubes are connected to the support 9 to which one end of a cable 10 is attached, which is also referred to herein as a pull rod and may be a steel line or cable. The other end of cable 10 is connected to the piston rod of a damping element 11 connected to a support 12 mounted on frame 8 of the vehicle. Cable 10 is also attached to a resistance plate 13 supporting an elastic element 14. The other end of the elastic element 14 bears on the support 15. It is possible to use another configuration for mounting the elastic or damping elements, for example, the elastic element may be supported at only one end or the cable may be made of elastic material and may include the piston rod of the damping element.

Cable 10 extends along the steering axis of the handle bar 7, through a hole in upper support 5, fork column 6 and a hole in the bottom support 4, and then about a turning roller 16, carried on a support 17 connected to frame 8 of the vehicle.

During riding the vehicle on bumpy roads, the front wheel vibrations are transmitted onto the fork 1, as indicated by a double arrow. The forces having impact along the fork axis are transmitted through support 9 and cable 10 to elastic element 14 and damping element 11.

Figure 2:
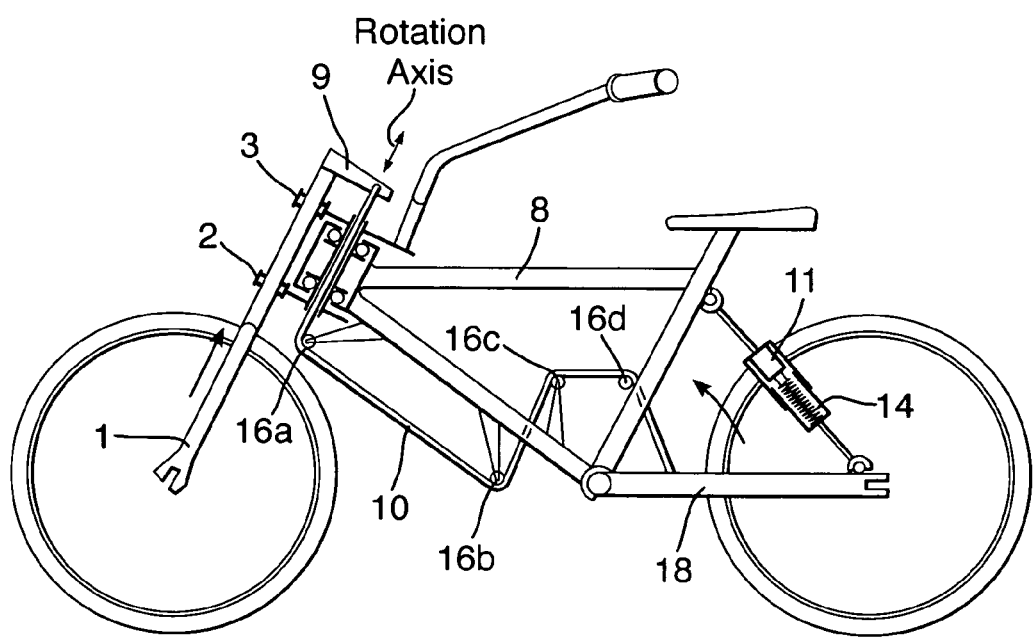
FIG. 2 shows schematically the mode of operation of the vehicle position stabilisation system during breaking or rapid acceleration.

FIG. 2 shows an alternate embodiment of a vehicle position stabilizing system in accordance with this invention during impact of the inertial forces which occur during braking or accelerating. The aim of this system, in particular, is to prevent the "vehicle diving" during breaking with the front wheel.

Using like numerals to refer to corresponding elements to FIG. 1, cable 10 in FIG. 2 is attached at one end to support 9 and extends about turning rollers 16*a*, 16*b*, 16*c* and 16*d*, and through suitable holes in the frame 8, and is attached at the other end to rocker 18 of the vehicle rear suspension. Elastic element 14 and damping element 11 are mounted between rocker 18 and frame 8. These elements also constitute the rear suspension shock absorber which allows for extra reduction of the vehicle mass.

Front wheel vibrations are transmitted onto fork 1 and through support 9 and cable 10 to elastic element 14 and damping element 11 of the rear shock absorber. Functioning of the system in FIG. 2 is similar to that in FIG. 1, and, during breaking and especially during breaking with the front wheel inertia of the vehicle together with the cyclist, allows fork 1 to shift-up in relation to the sleeves 2 and 3 (the so called "vehicle diving"). This force is transmitted by cable 10 to rocker 18, resulting in the rear shock absorber compression and decrease of the rear wheel pressure on the ground, as indicated by the arrow. As a result, the rear wheel is lifted up and the vehicle is lowered keeping the parallel position in relation to the ground. This will occur during breaking with small inertia force when the reactive force of the rear wheel on the ground occurs. It is crucial that the rear wheel reactive force depends on the force exerted by cable 10 on rocker 18 which counteracts the vehicle inertia directed to the front.

The vehicle also keeps its parallel position to the ground during accelerating. In this case inertia forces cause the decrease of the longitudinal force stretching cable 10 and consequently, the lengthening of the rear shock absorber. Similarly to the previous case this phenomenon occurs during accelerating with small inertia force when inertia forces which are directed to the rear and causing the shortening of the rear shock absorber are smaller than the force exerted by the elastic element 14.

Further description presents alternate embodiments of the front suspension in accordance with this invention, wherein like numbers to refer to the corresponding elements in FIG. 1.

Figure 4:
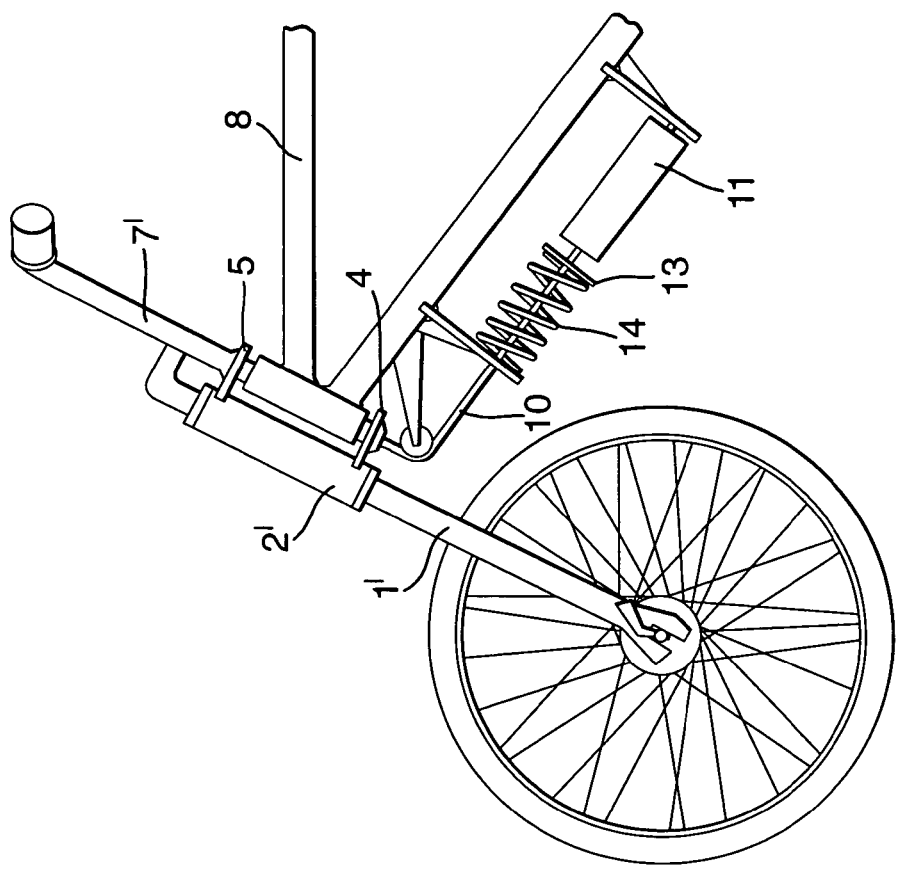
FIG. 4 shows the embodiment in FIG. 3 in side view.
Figure 3:
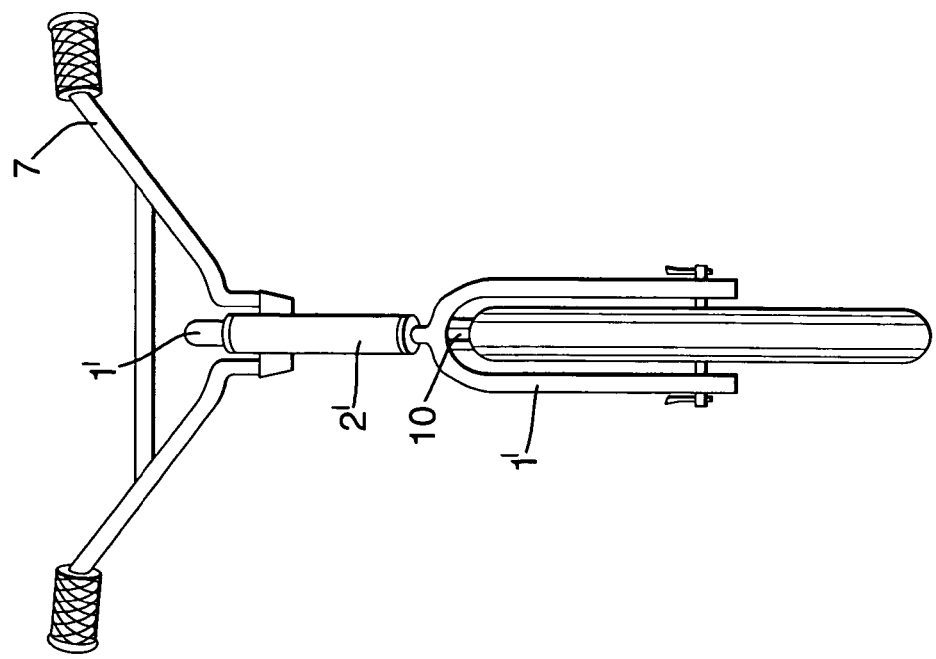
FIG. 3 shows, in front view, the example embodiment of the front suspension in the application for a bicycle.

FIG. 3 and FIG. 4 show a bicycle front where suspension according to the invention was applied. In this embodiment, fork 1' comprises tubes that are connected with each other directly over the front wheel. The suspension utilizes a single sleeve 2', as opposed to the upper and the bottom sleeves in FIG. 1. The shaft of fork 1' extends through the sleeve 2' and is bent at the top back between two arms of handle bar 7'. In order to avoid twisting of the fork shaft in sleeve 2', sleeve 2' is equipped with suitable slide linings decreasing friction of the fork shaft and includes profiling gearing with the projection of the fork shaft.

In the embodiment shown in FIG. 5, instead of a turning roller, a rocker 16' rotationally mounted on support 17 affixed to vehicle frame 8 is used. Moreover, instead of a single cable in the prior embodiments, two cables 10*a* and 10*b* are used. The use of a rocker 16' allows for using two stiff cables 10*a* and 10*b*, instead of one flexible line. Like in the previous embodiments, a single fork 1" is used having tubes that converge above the vehicle wheel. However, in this embodiment, the twist axis of the handle bar 7", which is the axis of fork column 6' of handle bar 7", overlaps with the shift axis of the fork 1", that is with the sleeve 2" axis, in which the fork 1" is received and which is a component element of the bicycle frame 8.

As shown in partial section in FIG. 5, cable 10*a* is attached at one end inside upper stopper 19 of fork 1" and extends inside the fork shaft along the twist axis of the handle bar 7" and exits near where the fork tubes are connected to each other and to the fork shaft and is mounted rotationally in a hole in rocker 16'. Cable 10*b* is rotationally received at one end in a second hole in rocker 16' and at the other end is connected with a catch 13' of a spring 14'. Spring 14' functions as an elastic element and is connected rotationally at the other end to a support 12 mounted to the vehicle frame.

Magnification of section A—A of FIG. 5 shows fork column 6' of the handle bar seated on the sleeve 2" in which the fork 1" is received. The fork column 6' has an internal spline in which the upper part of the fork shaft is seated having suitable cut-outs creating the splined sliding joint. This joint allows movement of the fork along the handle bar twist axis and simultaneously transfers the angular forces between the handle bar 7" and the fork 1".

Although the presented examples relate mainly to a bicycle it should be obvious to persons skilled in the art that these solutions may be used in motor-bicycles, motorcycles, tricycles and other vehicles equipped with front steerable wheel. The examples presented above should not be considered as exhaustive or limiting the present invention, the spirit of which is characterised in claims.

The invention claimed is:

1. A front suspension for a vehicle comprising a vehicle frame, a front steerable wheel, a front wheel fork mounting the front steerable wheel to the vehicle frame, and a handle bar operably connected to the front wheel fork and steerable about a steering axis, said suspension comprising at least one element that is an elastic element or a damping element operably connected to the vehicle frame;

at least one cable connected at one end to the front wheel fork and the other end to the at least one element, said cable comprising a portion extending along the steering axis and adapted to slide in response to movement of the front steerable wheel, and at least one guide supported on the vehicle frame for guiding the cable between the steering axis and the elastic element or damping element, said guide being a turning roller.

2. The front suspension as claimed in claim 1, characterised in that the guide is a rocker connecting two segments of the cable.

3. The front suspension as claimed in claim 1, characterised in that the fork is adapted to slide in at least one sleeve connected to a fork column of the handle bar.

4. The front suspension as claimed in claim 3, characterised in that the sleeve comprises rolling elements.

5. The front suspension as claimed in claim 3, characterised in that the sleeve comprises slide linings.

6. The front suspension as claimed in claim 1, characterised in that the front wheel fork has a shift axis of fork substantially parallel to the steering axis.

7. The front suspension as claimed in claim 6, characterised in that the fork column of the handle bar is seated rotationally on the sleeve and connected to the fork by a sliding splined coupling.

8. The front suspension as claimed in claim 1, characterised in that the cable is connected at the other end to the vehicle rear suspension.

9. The front suspension as claimed in claim 8, characterised in that the elastic element and/or the damping element is the shock absorber of the vehicle rear suspension.

10. The front suspension as claimed in claim 1, characterised in that the cable is formed of a flexible material.

* * * * *